United States Patent [19]

Mitomi et al.

[11] Patent Number: 4,500,581

[45] Date of Patent: Feb. 19, 1985

[54] MATERIAL FOR PROTECTING HUMAN BODIES FROM HARMFUL OR POISONOUS CHEMICAL SUBSTANCE

[75] Inventors: Takeshi Mitomi; Eiji Yoshimura; Hideki Komagata, all of Otsu, Japan

[73] Assignee: Boseki Kabushiki Kaisha, Japan

[21] Appl. No.: 360,083

[22] Filed: Mar. 19, 1982

[30] Foreign Application Priority Data

Mar. 20, 1981 [JP] Japan .................................. 56-41048

[51] Int. Cl.³ ................................................ B32B 3/02
[52] U.S. Cl. ........................................ 428/85; 428/96;
428/218; 428/219; 428/233; 428/246; 428/252;
428/253; 428/408; 428/446
[58] Field of Search ................. 428/85, 218, 219, 233,
428/234, 246, 252, 253, 408, 446, 96

[56] References Cited

U.S. PATENT DOCUMENTS

| | | | |
|---|---|---|---|
| 3,769,144 | 10/1973 | Economy et al. | 428/408 |
| 3,991,248 | 11/1976 | Bauer | 428/245 |
| 4,217,386 | 8/1980 | Arons et al. | 428/408 |
| 4,298,643 | 11/1981 | Miyagawa et al. | 428/85 |
| 4,341,830 | 7/1982 | Betts et al. | 428/408 |

*Primary Examiner*—James J. Bell
*Attorney, Agent, or Firm*—Jones, Tullar & Cooper

[57] ABSTRACT

A protective material comprising a cloth layer wherein the apparent density at one of the surfaces is smaller than that of the entire body of the cloth layer and a layer of active carbon integrally provided on the other surface of the cloth layer.

21 Claims, 3 Drawing Figures

MATERIAL FOR PROTECTING HUMAN BODIES FROM HARMFUL OR POISONOUS CHEMICAL SUBSTANCE

BACKGROUND OF THE INVENTION

The present invention relates to a material for protecting human bodies from harmful or poisonous chemical substances such as phosphorus agricultural chemicals.

When, for instance, phosphorus agricultural chemicals are applied to rice fields by scattering, the workers suffer seriously from the harmful or poisonous action of the chemicals through the skin. In order to avoid such harmful or poisonous action, the workers usually wear special work clothes which protect them from the chemicals, i.e. protective garments.

In general, the material, of which protective garments are made, is required to satisfy two functions, i.e. protection and mobility, which are contradictory to each other. When the protection function only is taken into consideration, a rubber coated cloth is usable as such material. However, the rubber coated cloth is not suitable from the aspect of mobility, because it is too heavy and stiff. In addition, owing to the lack of gas permeability, rubber coated cloth prevents the discharge of sweat or its vapor, causing heat stress to a wearer.

For overcoming such drawbacks, it was proposed to introduce a stream of air into a protective garment by a blower so as to make the pressure inside the protective garment higher than that outside. However, this proposal adds weight to the protective garment so that mobility is reduced.

Usually, a harmful or poisonous chemical substance exists in a vapor or liquid state. Therefore, the material to be used for manufacture of the protective garments (hereinafter referred to as "protective material") should prevent a harmful or poisonous chemical substance in a vapor or liquid state from passing therethrough to the inside, permitting the ready discharge of sweat or its vapor and the easy release of inside heat. Further, it should be light-weight, thin and soft so as to assure good mobility. In addition, it preferably should have excellent mechanical strength such as tensile strength and tear strength so as to allow its repeated use. Also preferably it should have high water and oil repellency while maintaining a good adsorptive property over a long period of time.

DESCRIPTION OF THE INVENTION

Figure 1:
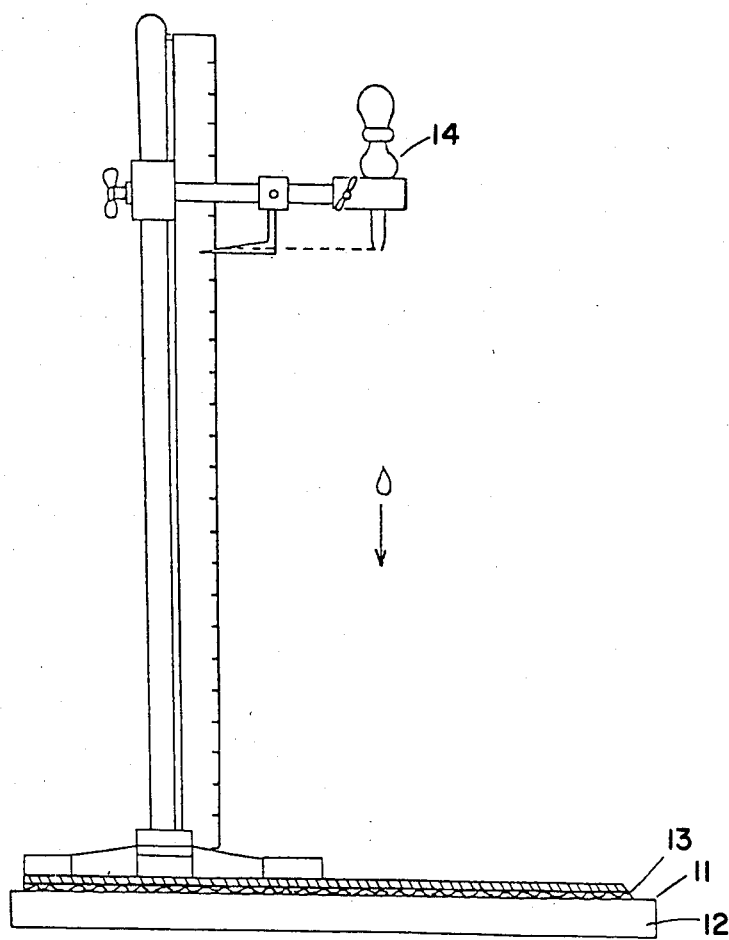
FIG. 1 represents the apparatus used to measure penetration by drops of a chemical substance.

According to the present invention, there is provided a protective material which is satisfactory not only in the protection function but also provides mobility and has excellent physical properties.

The protective material of this invention comprises a cloth layer wherein the apparent density at one of the surfaces is smaller than that of the entire body of the cloth layer, and a layer of active carbon integrally provided on the other surface of the cloth layer. Preferably, the surface of the cloth layer to have a smaller apparent density is formed as a buffed or piled layer so as to provide the entire body of the cloth layer with an apparent density of 0.08 to 0.30 g/cm$^3$ and the buffed or piled layer with an apparent density of 0.05 to 0.20 g/cm$^3$. Further, the cloth layer has a good gas permeability as well as a high heat transfer rate. Furthermore, the cloth layer can be provided with water and oil repellency. The term "buffed layer" hereinabove used is intended to mean a layer of fluff prepared, for instance, by buffing the surface of the cloth with needles or the like and having an average fluff length of not less than 0.3 mm. The term "piled layer" is intended to mean a layer of fibers or yarns systematically formed in loops at the surface of woven or knitted fabrics and includes the so-called "cut pile" wherein the once formed loops are cut by knives or the like.

The protective material of the invention has an adequate gas permeability and yet can adsorb a harmful or poisonous chemical substance in a vapor state efficiently onto the active carbon layer. The cloth layer serves to prevent the penetration of the chemical substance in a liquid state. Thus, the chemical substance in a liquid state is caught by the cloth layer, particularly on the buffed or piled layer provided at its surface, and vaporized there, and the vaporized chemical substance is then adsorbed onto the active carbon layer. When the cloth layer is provided with water and oil repellency, the said catching effect is much more enhanced. The adsorbing capability of the active carbon layer is lowered when the chemical substance contacts the carbon layer in a liquid state, Such lowering is effectively prevented by the presence of the cloth layer. Advantageously, the protective material is light-weight and soft and therefore does not handicap mobility.

The protective material of the invention usually has a weight of not more than 500 g/m$^2$, preferably of not more than 300 g/m$^2$. Its thickness is preferred to be not more than 3 mm, particularly not more than 2 mm in order to assure desirable softness and heat transfer rate. The gas permeability may be not less than 500 ml/cm$^2$/min, preferably not less than 700 ml/cm$^2$/min, under a pressure difference of 1.27 cm in a water level gauge, whereby the heat stress can be sufficiently suppressed.

For instance, test persons wearing protective garments prepared by the use of protective materials having various physical characteristics had walked with a speed of 5 km/hr under an atmospheric stream of 0.1 m/sec at 30° C. in a relatively humidity of 70%, remarkable heat stress was produced within 30 minutes from the start of the test in the case that the protective materials had a heat transfer rate of not more than 10 Kcal/m$^2$.hr.°C. (determined according to JIS (Japanese Industrial Standards) L-1018). The pulses of the test persons were increased from about 75/minute at the start of the test to more than about 150/minute, and their rectal temperatures exceeded 39° C. Since the situation was quite dangerous, further test was discontinued. Analyzing the test results, it was confirmed that in order to allow work over a period of 2 hours (which corresponds to the minimum time required for the usual work of scattering of an agricultural chemical) under the conditions of high temperature and a high humidity comparable to those of the summer season in Japan, the protective material should provide a heat transfer rate of not less than 10 Kcal/m$^2$.hr.°C., preferably not less than 15 Kcal/m$^2$.hr.°C. and a moisture vapor permeability rate (after 1 hour) of not less than 10%, preferably not less than 20% (determined according to JIS L-1018). These conditions can be attained when the protective material has the physical characteristics as above stated. Besides, the protective material preferably should have at least some moisture absorption ability, and such requirement can be satisfied with the protective material of the invention.

When the active carbon layer is in a fabric state, its gas permeability is preferred to be not more than 15,000 ml/cm$^2$/min for assuring a good adsorbing performance. Also, in order to secure the gas permeability of the whole body of the protective material to a level of not less than 500 ml/cm$^2$/min, the active carbon layer is preferred to have a gas permeability of not less than 700 ml/cm$^2$/min in consideration of the effect resulting from overlapping. When, for instance, two sheets of cloth having different gas permeabilities within a range of 200 to 20,000 ml/cm$^2$/min are laid together, the gas permeability of the cloth having a lower gas permeability is decreased by about 25 to 40%. Therefore, the cloth to be laid on another cloth having a minimum gas permeability of 700 ml/cm$^2$/min should have a gas permeability of 700 ml/cm$^2$/min or more.

The cloth to be integrally combined with the active carbon layer should have the surface of a smaller apparent density than that of the entire body of the cloth layer for prevention of the chemical substance in a liquid state from penetration or permeation. As the parameter to express the prevention of penetration or permeation of the chemical substance of the cloth layer and the gas permeability of such cloth layer, the use of an apparent density is proper. The relationship between the apparent density and the gas permeability is very close, and when the apparent density exceeds 0.30 g/cm$^2$, the gas permeability becomes lower than 700 ml/cm$^2$/min. The apparent density of the cloth layer can be determined according to JIS L-1018. The apparent density of the buffed or piled layer only can be also determined according to JIS L-1018.

The prevention of penetration of the chemical substance in a liquid state may be measured by a dropping test. Explaining the test method referring to FIG. 1 of the accompanying drawings which shows a plane view of an apparatus to be used for the test, a sheet of cloth to be tested (13) is placed on a transparent glass plate (12) thinly coated on its surface with red iron oxide (11) in such a manner that the buffed or piled surface faces upward. From various heights, the chemical substance (e.g. chloroform) colored with a dyestuff or a pigment is dropped by a dropper (14), and the prevention of penetration is evaluated. In case of a relatively thin and dense cloth having short length of buff or pile with an apparent density of 0.30 g/cm$^3$ or more (the apparent density of the buffed or piled layer only exceeding 0.20 g/cm$^3$), the drop of the chemical substance tends to spread and permeate within a short period of time by the capillary phenomenon among threads or fibers, even when dropped from a relatively low position of about 1 cm distance. In case of a knitted or woven cloth prepared by extremely dense application of hard twisted yarns and having an apparent density of 0.40 g/cm$^3$ or more, the capillary phenomenon is less apt to occur and a considerable time is needed for permeation and spreading. However, in this case, the gas permeability is much lowered. In case of a cloth having an apparent density of less than 0.08 g/cm$^3$, the drop penetrates through the cloth irrespective of the position of the dropper. Thus, the said test is aimed at judgement of the state of oozing out of the dropped chemical substance to the reverse surface of the test cloth by the capillary phenomenon, and the test cloth which shows oozing out when dropping height is higher, may be considered as having a better preventive property of penetration or permeation.

When the protective material of this invention, particularly provided with a water or oil repellency, is used, the drop of the chemical substance is retained at the buffed or piled surface of the cloth layer and then gradually diffused into the base texture, during which the drop is almost evaporated without permeating to the reverse surface. The vaporized chemical substance is readily caught by the active carbon layer, even if it permeates through the cloth layer to the reverse surface. For achievement of such prevention, the apparent density of the cloth layer is preferred to be from 0.08 to 0.30 g/cm$^3$, particularly from 0.10 to 0.25 g/cm$^3$, and that of the buffed or piled layer therein is favored to be from 0.05 to 0.20 g/cm$^3$, particularly from 0.07 to 0.15 g/cm$^3$. When the apparent density of the cloth layer is less than 0.08 g/cm$^3$ or that of the buffed or piled layer is less than 0.05 g/cm$^3$, a sufficient cushion effect against the drop of the chemical substance cannot be exerted so that such drop tends to penetrate readily through the cloth layer. Advantageously, the cloth layer having the apparent density as defined above shows a dust eliminating effect.

Figure 2:
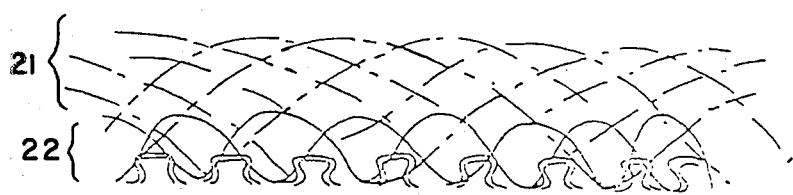
FIG. 2 represents an enlarged section view of a double reed French pile fabric.

To make more detailed explanations about the cloth layer, it may be constituted with any cloth which is relatively bulky and light, excellent in size stability and largely free for designing. Examples of such cloth may be a raised warp knit fabric such as French pile fabric. In case of French pile fabric, the piled portion may comprise the pile structure of two or more layers having different densities. As seen in FIG. 2 showing an enlarged section view of a double reed French pile, the piled layer (21) has only the piles consisting of the sinker loops of the front threads, while the piled layer (22) includes, in addition thereto, the piles consisting of the sinker loops of the back threads. Thus, the pile density at the piled layer (22) is higher than that at the piled layer (21) so that, even if the chemical substance in a liquid state passes through the piled layer (21), it can be prevented by the piled layer (22). A cloth in the state of non-woven fabric is not favorable, because the strength is relatively low and the softness is insufficient. In addition, the chemical substance in a liquid state is readily permeable therethrough.

For imparting a water and oil repellency to a cloth layer, the cloth may be treated with any water and oil repellent by a per se conventional procedure. For instance, the cloth may be dipped in a solution of a commercially available silicone or fluorine-containing repellent in an appropriate solvent, followed by drying and curing. The amount of the repellent to be deposited on the cloth may be usually not less than 1.0% by weight on the basis of the weight of the cloth.

The adhesive carbon layer may be formed by fixing active carbon powders or granules on a base cloth such as a buffed or piled cloth together with a thermoplastic adhesive agent in a powdery or non-woven cloth state under application of heat. Preferably, it may be constituted with a cloth comprising active carbon fiber having a specific surface area of 600 to 2,500 m$^2$/g. In any event, the thickness of the active carbon layer is desirable to be not more than 3 mm.

Preparation of a cloth comprising active carbon fiber from fibrous materials such as cotton, hemp, regenerated cellulose fibers, polyvinyl alcohol fibers, acrylic resin fibers, aromatic polyamide fibers, crosslinked formaldehyde fibers, lignin fibers, phenolic resin fibers and petroleum pitch fibers may be carried out by any conventional procedure. For instance, such fibrous materials are subjected to flame-retarding treatment at a temperature of not more than 400° C., if necessary, after deposition of an appropriate flame-retarding agent thereon, and then to carbonization and activation at a temperature of 500° to 1000° C. Among various fibrous materials, regenerated cellulose fibers, phenolic resin fibers and acrylic resin fibers are particularly favorable, because the resulting active carbon fibers show good physical properties such as mechanical strength and adsorption. The reactivation treatment is normally carried out under the atmosphere containing an activating gas such as steam or carbon dioxide in an amount of 10 to 70% by volume while heating at a temperature higher than 700° C. The active carbon fiber after carbonization and reactivation, may be formed into a cloth form, but preferably the fibrous material in the form of woven fabric, knitted fabric, non-woven fabric or the like is subjected to carbonization and activation. Suitable choice of activation temperature, time, concentration of activating gas, etc. affords active carbon fiber having a specific surface area of 600 to 2,500 m²/g.

The cloth of active carbon fiber is gas permeable and may be shaped in any form such as felt or fabric. In view of easiness in bonding onto the base cloth as the cloth layer, difficulty of elimination of fibers, small thickness, softness, etc., an active carbon fiber cloth in a woven or knitted fabric form is preferred. Especially, the active carbon fiber cloth in a knitted fabric form is advantageous in that the yarns constituting the cloth have a high freedom of shape in the cloth. Thus, it is more supple than the cloth in a woven fabric form. Since the elongation is high even after carbonization and activation, a protective garment made thereof can fit well to the body of the wearer. Further, it has a larger porosity and a higher air permeability than that in a woven fabric form so that the release of sweat or its vapor as well as heat to the outside of the garment can be achieved more easily. Furthermore, in carbonization and activation, the raw fabric has a tendency to produce remarkable volume or area shrinkage. In case of the woven fabric, which has a high apparent density and produces a high mutual cohesion, the shrinkage during carbonization and activation cannot be sufficiently absorbed so that wrinkles or ripple-like strains are produced at the surfaces. In case of the knitted fabric, wherein the yarns have a greater freedom and the mutual cohesion among the yarns is smaller, the shrinkage can be well absorbed so that the surfaces are flat and smooth. Moreover, on the lamination with any other material, the production of stress is unavoidable. In case of the knitted fabric having a high elongation, local concentration of stress is hardly produced so that good processing can be attained without cracks or breaks.

Bonding of the base cloth as the cloth layer and the active carbon fiber cloth as the active carbon layer may be accomplished, for instance, by the use of a thermoplastic adhesive agent in a non-woven fabric state having a weight of 50 g/m² or less. As the thermoplastic adhesive agent, it is desirable to choose the one having a low melting point for suppressing the increase in the apparent density of the base cloth resulting from crushing of the buff or pile during heating or press finishing. Thus, the melting point of the thermoplastic adhesive agent is preferred to be not more than 150° C., particularly not more than 120° C. As the resin material for the thermoplastic adhesive agent, there may be used any commercially available resin of ester type, amide type, vinyl acetate type, etc. Particularly favorable is a resin having high solvent resistance. Any other bonding procedure may be also adopted.

As understood from the above, the essential components of the protective material of the invention are a cloth having a certain specific apparent density as the cloth layer and an active carbon fiber fabric as the active carbon layer, which are integrally combined. For practical use, the combined product may be reinforced by overlapping a cloth onto each of the surfaces of the combined product. For instance, a cloth as the outside cloth layer may be provided on the base cloth, and another cloth as the inside cloth layer may be provided on the active carbon fiber fabric. The cloths employed as the outside cloth layer and as the inside cloth layer may be made of any natural fiber (e.g. cotton, hemp) or any synthetic fiber (e.g. polyester, polyamide, regenerated cellulose) and shaped in any conventional form such as woven fabric, non-woven fabric, felt or knitted fabric. The cloth used as the outside cloth layer preferably has water and oil repellency and has a thickness of 0.1 to 1.5 mm. It is usually made of a synthetic fiber. The cloth used as the inside cloth layer preferably is moisture-absorptive and has a thickness of 0.1 to 1.5 mm. It is usually made of a natural fiber or a synthetic fiber, preferably of a natural fiber. Further, the outside cloth layer and the inside cloth layer may be respectively constituted with two or more cloth sheets.

Figure 3:
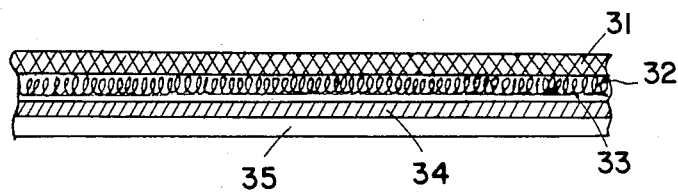
FIG. 3 represents an enlarged section view of an embodiment of the invention.

A typical embodiment of the protective material of the invention is given in FIG. 3 showing an enlarged section view thereof. In this figure, a synthetic fiber cloth (31), preferably provided with water and oil repellency, is present as the outside cloth layer in contact with the buffed or piled surface (32) of a base cloth (33) as the cloth layer. The base cloth (33) is preferably provided with water and oil repellency at least at the buffed or piled surface (32) and combined integrally with an active carbon fiber fabric (34) as the active carbon layer at the other surface. Inside the active carbon fiber fabric (34), there is present a natural fiber cloth (35) in contact therewith. The natural fiber cloth is moisture-absorptive. With such protective material, a protective garment may be manufactured in such a way that the synthetic fiber cloth (31) constitutes the outside layer and contacts to the atmosphere, while the natural fiber cloth (32) constitutes the inside layer and contacts to the body of the wearer.

Throughout the specification, the value of the gas permeability represents the value measured with air.

Practical and preferred embodiments of the present invention are illustratively shown in the following examples.

The thickness of the cloth was measured according to JIS L-1018. Namely, the thickness (mm) of the cloth was measured at not less than 5 points by the aid of a thickness measuring apparatus under an initial load of 7 g/cm² (in the case having no buffed or piled surface) or 3 g/cm² (in the case having a buffed or piled surface) for 10 seconds, and the average value was calculated.

The thickness of the buffed or piled layer was determined as follows: the thickness of the cloth (in the case having a buffed or piled surface) was measured as above; after elimination of the buffed or piled layer by shearing or burning, the thickness of the resulting cloth (in the case having no buffed or piled surface) was measured as above; the difference between the values above measured was calculated.

The apparent density was determined according to the following formula: $D = W/1000 \times T$ wherein $D$ is the apparent density (g/cm$^3$), $W$ is the weight (g/m$^2$) and $T$ is the thickness (mm).

EXAMPLE 1

By the use of a 28 gauge double reed tricott knitting machine, polyester false-twist textured yarns (75 denier; 24 filaments) and false-twisted texture yarns (20 deninier; 8 filaments) were fully set respectively onto the front reed and the back reed to knit a warp knit fabric with a texture of front 1-0/3-4 and back 1-0/1-2. Thereafter, the knitted fabric was stretched in a machine direction to produce loop piles so as to provide French piles. The resultant knitted fabric was dyed, treated with a fluorine-containing water and oil repellent ("Asahi Guard AG 710" manufactured by Asahi Glass Co., Ltd.), dried and cured at 150° C., whereby the repellent was deposited thereon in a solid content of 2% by weight. The thus obtained knitted fabric had a thickness of 0.98 mm, a weight of 115 g/m$^2$, an apparent density (cloth) of 0.117 g/cm$^3$ and an apparent density (piled layer) of 0.092 g/cm$^3$. The gas permeability was 8,300 ml/cm$^2$/min under a pressure difference of 1.27 cm in a water level gauge and a water repellency of 100 (determined according to JIS L-1006).

On the other hand, by the use of a 28 gauge circular interlock knitting machine, spun yarns made of regenerated cellulose fiber (single yarn, 2.0 denier; 40's/1) were knitted to make a circular interlock knitted fabric having a weight of 125 g/cm$^2$, break elongations of 85% in warp and of 140% in weft and a gas permeability of 7,650 ml/cm$^2$/min. This knitted fabric was subjected to scouring and then soaked in an aqueous solution of diammonium hydrogen phosphate, followed by drying. The thus treated knitted fabric bearing diammonium hydrogen phosphate as a flame-retarding agent in a content of 10% by weight was heated at 280° C. in an inert atmosphere for 30 minutes to give a flame-retarding fiber fabric having a carbon content of 68% by weight. The fiber fabric was heated starting from 280° C. up to 880° C. for 90 minutes in an inert atmosphere, and the resulting carbonized fabric was heated at 880° C. in an atmoshpere steam in an amount of 20% by volume over a period of 2 hours for activation. The thus prepared activated carbon fiber fabric had a flat and beautiful surface without any crease or strain and the following physical characteristics: weight, 51 g/m$^2$; specific surface area, 1,400 m$^2$/g; thickness, 0.42 mm; gas permeability, 9,800 ml/cm$^2$/min; break elongation, 52% in machine direction and 108% in transverse direction.

The knitted fabric and the active carbon fiber fabric as above prepared were laminated with a thermoplastic adhesive agent in a non-woven fabric state ("Dynack GX-900" manufactured by Kureha Fiber Co., Ltd.; M.P. 118° C.) under the application of heat by a heating roller so as to bond the active carbon fiber fabric onto the opposite surface (i.e. the reverse surface) of the knitted fabric. This laminated product was overlapped further with a synthetic fiber cloth of 80 g/m$^2$ as the outside cloth layer at the piled surface of the knitted fabric and a cotton cloth of 39 g/m$^2$ as the inside cloth layer at the surface of the active carbon fiber fabric to obtain a protective material, which had satisfactory gas permeability, mechanical strength and softness and the following physical characteristics: thickness, 1.93 mm; weight, 300 g/m$^2$; gas permeability, 2,895 ml/cm$^2$/min.

By the use of the protective material, a protective garment was manufactured and subjected to treadmill test. On walking at a speed of 5 km/hr under the conditions of a temperature of 30° C., a relative humidity of 70% and an air stream of 0.1 m/sec, the protective material showed a heat transfer rate of 45 Kcal/m$^2$.hr.°C. and a moisture permeability (after 1 hour) of 53%. Thus, it did not cause any remarkable physiological trouble to the wearer even after more than 6 hours of continuous wearing.

As to the gas adsorbing performance of the protective material, some tests were carried out. When determined according to JIS K-1474, the saturated adsorption amount of carbon tetrachloride was 39 g/m$^2$. Then, the protective material was cut out into a circular shape of 10 cm in effective diameter, which was set in a blower pipe. From one side of the blower pipe, air containing 10 ppm of carbon tetrachloride at 20° C. was introduced at a rate of 2 cm/sec, and the concentration of carbon tetrachloride in the air passed through the protective material was measured. As the result, the concentration of the gaseous substance at the outlet was not more than 0.01 ppm. The effect was maintained for 2 hours.

On the other hand, the permeation resistance of the French pile base cloth to the dropped liquid used for preparation of the protective material, i.e. the damping effect to the falling energy of the liquid drop, was studied. By the use of a testing apparatus as in FIG. 2, carbon tetrachloride colored with a dyestuff was dropped from various heights on the piled surface of the protective material to evaluate the permeability. As the result, it was found that said French pile base cloth showed excellent damping effect, and even when dropped from a height of 30 cm above the piled layer, the drop did not penetrate to the active carbon fiber fabric layer. Thus, carbon tetrachloride was evaporated in the state of being held in a drop form in the piled layer. Even when dropped from a height of 50 cm, no material penetration was observed, although slight oozing of the drop onto the active carbon fiber fabric was produced.

EXAMPLE 2

With polyester false-twist crimped yarns (150 denier; 30 filaments) as the pile yarn and nylon 6 false-twist crimped yarns (70 denier; 24 filaments) as the ground yarn, a circular knit single velour was knitted. The resulting knitted fabric was treated with a fluorine-containing water and oil repellent to deposit the repellent thereon in an amount of 1.8% by weight of the solid component. The resulting knitted fabric had a weight of 236 g/m$^2$, a thickness of 1.82 mm, an apparent density of 0.130 g/cm$^3$, an apparent density (piled layer) of 0.093 g/cm$^3$, a gas permeability of 4,120 ml/cm$^2$/min at a pressure difference of 1.27 cm on a water level gauge and a water repellency of 100.

On the other hand, a plain weave fabric made of novolak type phenol resin spun yarn (single yarn, 1.5 denier; 18's/1) and having a weight of 136 g/m$^2$ was heated at 300° C. in an inert atmosphere for 20 minutes, followed by heating in an inert atmosphere up to 900° C. in 2 hours for carbonization. Then, the carbonized fabric was heated at 900° C. in an atmosphere containing 25% by volume of steam over a period of 3 hours for activation. The resultant active carbon fiber fabric had a weight of 55 g/m², a specific surface area of 1,800 m²/g, a thickness of 0.40 mm and a gas permeability of 4,420 ml/cm²/min. The active carbon fiber fabric was laminated on the reverse surface of the knitted fabric with a polyamide type adhesive agent in a non-woven fabric state under the application of heat by a heat roller. The thus obtained protective material had a weight of 312 g/m², a thickness of 2.19 mm and a gas permeability of 3,095 ml/cm²/min. Its saturated adsorption amount of carbon tetrachloride was 72 g/m².

The protective material was cut out into a circular shape of 10 cm in effective diameter and set in a blower pipe. Air of 20° C. containing 10 ppm of carbon tetrachloride was introduced from one side of the blower pipe at a rate of 2 cm/sec, and the concentration of carbon tetrachloride in the air passed through the protective material was measured. The concentration of carbon tetrachloride at the outlet was not more than 0.01 ppm. Such preventive effect was kept for 3.7 hours. The penetration resistance of the reinforced knitted fabric against the falling drop of carbon tetrachloride was determined in the same manner as in Example 1. When dropped at a height of more than 60 cm, slight oozing of the liquid to the active carbon fiber fabric was observed. When dropped at a height of not more than 50 cm, no material penetration was observed.

COMPARATIVE EXAMPLE 1

By the use of cotton yarns of 30's/1 as the warp and cotton yarns of 10's/1 as the weft, a 3/1 twill weave fabric was produced. The resulting fabric was treated with a fluorine containing water and oil repellent to deposit the repellent thereon in an amount of 3.0% by weight of the resin. The resulting woven fabric had a weight of 230 g/m², a thickness of 0.57 mm, an apparent density of 0.40 g/cm³, a gas permeability of 500 ml/cm²/min and a water repellency of 90. The active carbon fiber fabric as used in Example 1 was laminated on the above obtained woven fabric with the adhesive agent as used in Example 1 by the aid of a heating roller. The resultant laminated product was overlapped with the synthetic fiber cloth and the cotton cloth as employed in Example 1. The thus obtained protective material had a weight of 415 g/m², a thickness of 1.52 mm and a gas permeability of 290 ml/cm²/min. The gas adsorption performance of the protective material was good like that in Example 1. But, the penetration resistance against the falling drop was poor. When, for instance, carbon tetrachloride was dropped from a height of not more than 5 cm, easy penetration of the drop was observed.

COMPARATIVE EXAMPLE 2

A stitch bond non-woven fabric made of nylon 6 fibers (2 denier) having a weight of 100 g/m² and a thickness of 1.70 mm was treated with a fluorine containing water and oil repellent to deposit the repellent thereon in an amount of 2.0% by weight. The resultant non-woven fabric had an apparent density of 0.060 g/cm³ and a gas permeability of 4,680 ml/cm²/min. Onto the reverse surface of the non-woven fabric, a mixture of powdery active carbon (specific surface area, 700 m²/g; particle size, 100-180 microns) and a polyester type thermoplastic adhesive agent in a powdery form (particle size, not more than 25 microns) in a weight proportion of 70:30 was dispersed uniformly at a rate of 60 g/m², followed by heating with a press heater to fix the particles of the active carbon. The penetration resistance of the thus obtained protective material against a falling drop of carbon tetrachloride was determined. But, it was very poor. When, for instance, carbon tetrachloride was dropped from a height of not more than 5 cm, easy penetration was observed.

What is claimed is:

1. A protective material, adapted to protect human bodies from chemical substances, comprising (A) a cloth layer having a buffed or piled surface layer which is adapted to prevent a chemical substance in a liquid state from penetrating the cloth layer and which has an apparent density (according to the formula: $D = W/100 \times T$, where D is the apparent density of the layer being measured (g/cm³), W is the weight of the layer being measured, and T is the thickness of the layer being measured (mm)) smaller than that of the entire body of the cloth layer, and (B) an active carbon layer adapted to absorb a chemical substance in a gaseous state integrally provided on the other surface of the cloth layer.

2. The protective material according to claim 1, wherein the surface of the cloth layer having a smaller apparent density is buffed.

3. The protective material according to claim 1, wherein the surface of the cloth layer having a smaller apparent density is piled.

4. The protective material according to claim 1, wherein the cloth layer is provided with a water and oil repellency.

5. The protective material according to claim 1, wherein the cloth layer comprises a two-layered structure.

6. The protective material according to claim 1, wherein the apparent density of the entire body of the cloth layer is 0.08 to 0.30 g/cm³ and the apparent density of the surface having a smaller apparent density is 0.05 to 0.20 g/cm³.

7. The protective material according to claim 6, wherein the apparent density of the entire body of the cloth layer is 0.10 to 0.25 g/cm³ and the apparent density of the surface having a smaller apparent density is 0.07 to 0.15 g/cm³.

8. The protective material according to claim 1, which has a weight of not more than 500 g/m².

9. The protective material according to claim 8, which has a weight of not more than 300 g/m².

10. The protective material according to claim 1, which has a thickness of not more than 3 mm.

11. The protective material according to claim 10, which has a thickness of not more than 2 mm.

12. The protective material according to claim 1, wherein the cloth layer has a thickness of 0.3 to 2.8 mm.

13. The protective material according to claim 1, wherein the surface of the cloth layer having a smaller apparent density has a thickness of 0.1 to 2.6 mm.

14. The protective material according to claim 1, which has a gas permeability of not less than 500 ml/cm²/min.

15. The protective material according to claim 1, wherein the cloth layer has a gas permeability of not less than 700 ml/cm²/min.

16. The protective material according to claim 1, wherein the active carbon layer is constituted with active carbon fiber.

17. The protective material according to claim 16, wherein the active carbon fiber is in a knitted state.

18. The protective material according to claim 16, wherein the active carbon fiber has a specific surface area of 600 to 2,500 m²/g.

19. The protective material according to claim 1, wherein the active carbon layer has a gas permeability of not more 15,000 ml/cm²/min.

20. The protective material according to claim 1, wherein the active carbon layer has a thickness of 0.2 to 2.7 mm.

21. The protective material according to claim 1, which further comprises a synthetic fiber cloth layer on the cloth layer and a natural fiber cloth layer on the active carbon layer.

* * * * *

UNITED STATES PATENT AND TRADEMARK OFFICE
CERTIFICATE OF CORRECTION

PATENT NO. : 4,500,581

DATED : February 19, 1985

INVENTOR(S) : Takeshi Mitomi, et al

It is certified that error appears in the above—identified patent and that said Letters Patent is hereby corrected as shown below:

On the title page;

In the heading for the patent, at item [73], change the name of the assignee to read:

--Toyo Boseki Kabushiki Kaisha, Japan--

Signed and Sealed this

Sixth Day of August 1985

[SEAL]

Attest:

DONALD J. QUIGG

Attesting Officer

Acting Commissioner of Patents and Trademarks